(12) United States Patent
Honda et al.

(10) Patent No.: US 9,873,099 B2
(45) Date of Patent: Jan. 23, 2018

(54) HEATING REACTION CONTAINER

(71) Applicant: Panasonic Intellectual Property Management Co., Ltd., Osaka (JP)

(72) Inventors: Kazuyoshi Honda, Osaka (JP); Kensuke Nakura, Osaka (JP); Ryuichi Natsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 15/062,951

(22) Filed: Mar. 7, 2016

(65) Prior Publication Data

US 2016/0288082 A1 Oct. 6, 2016

(30) Foreign Application Priority Data

Apr. 1, 2015 (JP) .................. 2015-075218

(51) Int. Cl.
*F27B 14/12* (2006.01)
*F27D 1/18* (2006.01)
(Continued)

(52) U.S. Cl.
CPC .................. *B01J 3/03* (2013.01); *B01J 19/02* (2013.01); *B01J 2219/029* (2013.01);
(Continued)

(58) Field of Classification Search
CPC ......... F27D 2099/0078; F27D 99/0073; F27D 99/0076; F27D 1/1808; F27D 1/1858;
(Continued)

(56) References Cited

U.S. PATENT DOCUMENTS 1,482,887 A * 2/1924 Collins .................... C21D 1/46
220/23.87
5,020,992 A * 6/1991 Molenaar .................. C21B 7/14
432/248
(Continued)

FOREIGN PATENT DOCUMENTS

CA  2932161 A1 *  6/2015  ............. F27D 3/085
FR  2478285 A1 *  9/1981  ............... F27B 3/06
(Continued)

*Primary Examiner* — Gregory A Wilson
(74) *Attorney, Agent, or Firm* — McDermott Will & Emery LLP

(57) ABSTRACT

Heating reaction container comprises: a first member; a second member; and a third member. An opening is closed by the second member being detachably fitted in the first member and by the third member being detachably fitted in the second member. α1, α2, and α3 satisfy a relation of α3>α2>α1, α3=α2>α1, or α3>α2=α1, where α1 represents a thermal expansion coefficient of a first material of the first member, α2 represents a thermal expansion coefficient of a second material of the second member, and α3 represents a thermal expansion coefficient of a third material of the third member. A gap is present before heating, and a space is sealed, through the heating, by a first contact surface coming into intimate contact with a second contact surface and by a third contact surface coming into intimate contact with a fourth contact surface.

9 Claims, 10 Drawing Sheets

(51) Int. Cl.
  *B01J 3/03* (2006.01)
  *B01J 19/02* (2006.01)
(52) U.S. Cl.
  CPC ............ *B01J 2219/0277* (2013.01); *B01J 2219/0286* (2013.01); *B01J 2219/1227* (2013.01); *B01J 2219/1242* (2013.01); *B01J 2219/1293* (2013.01); *B01J 2219/1296* (2013.01)
(58) Field of Classification Search
  CPC ... F23M 7/04; F27B 5/00; F27B 14/08; F27B 14/10; F24H 9/02; F17C 2201/0185
  See application file for complete search history.

(56) References Cited

U.S. PATENT DOCUMENTS 9,453,679 B2 * 9/2016 Zottler .................. C21C 5/5211
2012/0270167 A1 * 10/2012 Sato ....................... C30B 29/06
                                                            432/13
2015/0063399 A1 * 3/2015 Geib ....................... C03B 3/00
                                                            373/30
2015/0136001 A1 * 5/2015 Hoyt ...................... F27D 1/004
                                                            110/338
2016/0104515 A1 * 4/2016 Strange ................ G11B 25/043
                                                            360/99.18
2016/0212803 A1 * 7/2016 Juvonen .................. F27D 11/10
2017/0073786 A1 * 3/2017 Katsumata ................ F27B 5/08

FOREIGN PATENT DOCUMENTS

| JP | 56-090248 | 7/1981 |
| JP | 63-317752 | 12/1988 |
| JP | 8-151299 | 6/1996 |
| JP | 8-200956 | 8/1996 |
| JP | 2014-005161 | 1/2014 |

* cited by examiner

HEATING REACTION CONTAINER

BACKGROUND

1. Technical Field

The present disclosure relates to a heating reaction container.

2. Description of the Related Art

In technological innovation, materials play key roles. Various efforts are continued for acquiring target materials by searching for or designing new materials with higher in performance to match purposes of devices.

It is needless to mention that selection of a reaction raw material and design of a reaction process are important in acquiring a new material designed from combinations of limited elements. In some cases target materials can be obtained simply by mixing materials. In many other cases, however, applying energy absent in normal environments is necessary to advance reaction.

An example of the most representative energy sources for advancing chemical reaction is thermal energy. Advancing reaction by putting a reaction raw material into a container and heating the reaction material is a simple method, which is widely employed so as to obtain a target material.

In some cases using such a method, it is desirable to seal the reaction container so as to prevent loss in material, which is caused by for example, vaporization resulting from the heating, and deterioration in material, which is caused by for example, oxidation, and ensure the reaction atmosphere. When positive pressure or negative pressure is caused in the reaction container as the reaction proceeds, the reaction container needs to have a structure resistant to the pressure.

Japanese Unexamined Patent Application Publication No. 2014-5161 discloses a container body that includes a groove for supporting a lid along the outer or inner circumference of an opening and is used to sinter a graphite material. In the container body, the lid is placed on the top of the opening so that a frame unit of the lid is closed to sink, and a filler of powder or particles is filled.

Japanese Unexamined Patent Application Publication No. 8-151299 discloses a structure where a coupling part between an upper container and a lower container is sealed with a liquid sealant.

SUMMARY

One non-limiting and exemplary embodiment provides a heating reaction container that enables a heated reaction raw material to be held in a sealed state.

In one general aspect, the techniques disclosed here feature a heating reaction container comprising: a first member that comprises a first material and has an annular first contact surface; a second member that comprises a second material and has an annular second contact surface and an annular third contact surface positioned further inside than the second contact surface; and a third member that comprises a third material and has an annular fourth contact surface. One of the first member and the third member includes space having an opening to allow a reaction raw material to be provided into an inside of the space. The other one of the first member and the third member has a surface with which the opening is closed. The opening is closed by the second member being detachably fitted in the first member in a state where the first contact surface faces the second contact surface positioned further inside than the first contact surface and by the third member being detachably fitted in the second member in a state where the third contact surface faces the fourth contact surface positioned further inside than the third contact surface. $\alpha 1$, $\alpha 2$, and $\alpha 3$ satisfy a relation of $\alpha 3 > \alpha 2 > \alpha 1$, $\alpha 3 = \alpha 2 > \alpha 1$, or $\alpha 3 > \alpha 2 = \alpha 1$, where $\alpha 1$ represents a thermal expansion coefficient of the first material, $\alpha 2$ represents a thermal expansion coefficient of the second material, and $\alpha 3$ represents a thermal expansion coefficient of the third material. A gap is present at least one of between the first contact surface and the second contact surface and between the third contact surface and the fourth contact surface before heating of the reaction raw material, the space being sealed, through the heating, by the first contact surface coming into intimate contact with the second contact surface and by the third contact surface coming into intimate contact with the fourth contact surface.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
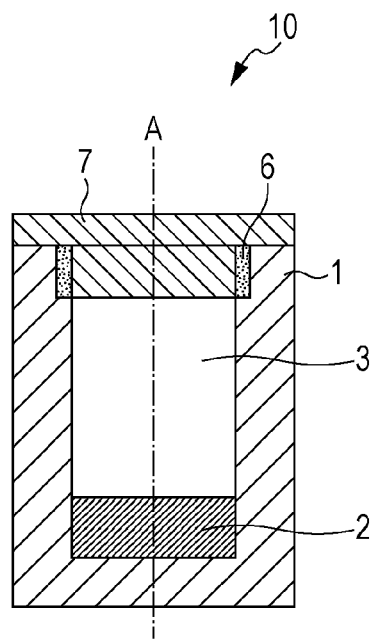
FIG. 1 is a cross-sectional schematic view illustrating a structure of a heating reaction container according to Embodiment 1 that exemplifies the present disclosure.

In generating a material by heating reaction, a reaction container that can ensure sealing properties even at a high temperature with a simple structure and be used repeatedly is desired.

An embodiment of the present disclosure provides a heating reaction container and a reaction method, which enable a reaction raw material to be held in a sealed state at a high temperature and can advance heating reaction without losing prepared composition. A heating reaction container according to an aspect of the present disclosure enables sealing at a high temperature to be performed with a simple structure, enables reaction of a prepared raw material that is provided in the heating reaction container to be advanced, and enables the reaction to be repeated at low cost.

The present disclosure includes heating reaction containers and reaction methods according to aspects (1) to (16) below.

(1) A heating reaction container including:

a first member that comprises a first material and has an annular first contact surface;

a second member that comprises a second material and has an annular second contact surface and an annular third contact surface positioned further inside than the second contact surface; and a third member that comprises a third material and has an annular fourth contact surface, wherein one of the first member and the third member includes space having an opening to allow a reaction raw material to be provided into an inside of the space, the other one of the first member and the third member has a surface with which the opening is closed, the opening is closed by the second member being detachably fitted in the first member in a state where the first contact surface faces the second contact surface positioned further inside than the first contact surface and by the third member being detachably fitted in the second member in a state where the third contact surface faces the fourth contact surface positioned further inside than the third contact surface, α1, α2, and α3 satisfy a relation of α3>α2>α1, α3=α2>α1, or α3>α2=α1, where α1 represents a thermal expansion coefficient of the first material, α2 represents a thermal expansion coefficient of the second material, and α3 represents a thermal expansion coefficient of the third material, and a gap is present at least one of between the first contact surface and the second contact surface and between the third contact surface and the fourth contact surface before heating of the reaction raw material, the space being sealed, through the heating, by the first contact surface coming into intimate contact with the second contact surface and by the third contact surface coming into intimate contact with the fourth contact surface.

(2) The heating reaction container according to aspect (1), where the second member independently holds a shape of the second member.

(3) The heating reaction container according to aspect (1) or (2), where the first contact surface is located inside the first member, the first member has a contact surface that comes into contact with the reaction raw material inside the first member, the second contact surface is located outside the second member, the third contact surface is located inside the second member, and the fourth contact surface is located outside the third member.

(4) The heating reaction container according to aspect (1) or (2), where the first contact surface is located inside the first member, the second contact surface is located outside the second member, the third contact surface is located inside the second member, the fourth contact surface is located outside the third member, and the third member includes a contact surface that comes into contact with the reaction raw material inside the third member.

(5) The heating reaction container according to any one of aspects (1) to (4), where each of the first material, the second material, and the third material is any one of metal, semimetal, carbon, and ceramic.

(6) The heating reaction container according to any one of aspects (1) to (5), where the first material and the second material are identical to each other or the second material and the third material are identical to each other.

(7) A heating reaction method using the heating reaction container according to any one of aspects (1) to (6), the heating reaction method including:

sealing the space, through the heating, by causing the first contact surface to come into intimate contact with the second contact surface and by causing the third contact surface to come into intimate contact with the fourth contact surface; and causing the reaction raw material to react in the sealed space.

(8) A heating reaction container including:
a first member that comprises a first material and has an annular first contact surface; and
a second member that comprises a second material and has a stair-like second contact surface including a plurality of contact surfaces, each of the plurality of contact surfaces being annular, where
distances from the plurality of contact surfaces to a vertical axis are different from each other,
one of the first member and the second member includes a space having an opening to allow a reaction raw material to be provided into an inside of the space,
the other one of the first member and the second member has a surface with which the opening is closed,
the opening is closed by the second member being fitted in the first member in a state where one contact surface selected from the plurality of contact surfaces faces the first contact surface positioned further outside than the selected one contact surface, and
a thermal expansion coefficient of the second material is larger than a thermal expansion coefficient of the first material.

(9) The heating reaction container according to aspect (8), where
the space is sealed, through heating, by the first contact surface coming into intimate contact with the selected one contact surface.

(10) The heating reaction container according to aspect (8) or (9), where
the first contact surface is located inside the first member,
the first member has a contact surface that comes into contact with the reaction raw material inside the first member, and
the second contact surface is located outside the second member.

(11) The heating reaction container according to aspect (8) or (9), where
the first contact surface is located inside the first member,
the second contact surface is located outside the second member, and
the second member has a contact surface that comes into contact with the reaction raw material inside the second member.

(12) The heating reaction container according to any one of aspects (8) to (11), where
each of the first material and the second material is any one selected from the group consisting of metal, semimetal, carbon, and ceramic.

(13) The heating reaction container according to any one of aspects (8) to (12), where
a step between adjacent two contact surfaces included in the plurality of contact surfaces has a value equal to or less than a predetermined value obtained through calculation based on sealing conditions.

(14) The heating reaction container according to any one of aspects (8) to (13), where
the first contact surface includes a tapered surface in an edge portion of the first contact surface.

(15) The heating reaction container according to any one of aspects (8) to (13), where
the second contact surface includes a tapered surface.

(16) A heating reaction method using the heating reaction container according to any one of aspects (8) to (15), the heating reaction method including:
fitting the second member into the first member and causing the first member and the second member to come into intimate contact with each other using the one contact surface selected from the plurality of contact surfaces;
sealing the space through the heating; and
causing the reaction raw material to react.

Embodiments of the present disclosure are described below with reference to the drawings. The present disclosure is not limited to the below-described embodiments. A change may be made as desired within the scope where advantages of the present disclosure are ensured. It is also possible to combine one embodiment with another embodiment. In the description below, the same references are given to the same or similar constituents. Overlapping explanation may be omitted.

Embodiment 1

A heating reaction container 10 according to Embodiment 1 is described with reference to FIGS. 1 to 5B and 13.

[1.1. Heating Reaction Container 10]

FIG. 1 schematically illustrates a cross section of the heating reaction container 10 according to Embodiment 1 along the vertical direction. The heating reaction container 10 includes a first member 1, a second member 6, which is annular, and a third member 7. In the present disclosure, the expression "annular" indicates a shape that surrounds an axis A, which is parallel to the vertical direction in a space of the heating reaction container 10, so as to constitute a circumference. Although being typically circular, the "annular" shape may be oval, rectangular, or polygonal for example. Each of contact surfaces 5A to 5D described below is annular.

The first member 1 is a body of the heating reaction container 10 having a hollow cylindrical shape and includes a space 3 for holding a reaction raw material 2. The second member 6 is a sealing member of the heating reaction container 10 and the third member 7 is a lid of the heating reaction container 10.

Figure 2:
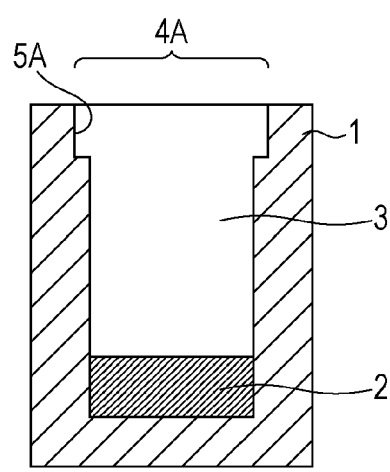
FIG. 2 is a cross-sectional schematic view illustrating a first member of the heating reaction container according to Embodiment 1 that exemplifies the present disclosure.

FIG. 2 schematically illustrates a cross section along the vertical direction of the first member 1. The first member 1 includes the contact surface 5A, which is annular, and another contact surface, which comes into contact with the reaction raw material 2, inside the first member 1. The first member 1 further includes an opening part 4A in an upper portion of the first member 1. Various materials resistant to a target reaction temperature are selectable as a first material that constitutes the first member 1. Specific examples include various kinds of metal, semimetal, carbon, and ceramic. For example, elemental metals and alloys are included in such various kinds of metal. The semimetal indicates a substance that exhibits intermediate properties between metal and nonmetal in the classification of elements. For example, boron, silicon, and germanium are suitable for uses of the present disclosure in terms of processability, thermal resistance, safety, and the like.

The opening part 4A is a portion where a sealed structure is formed by the second member 6, which is described below, being inserted into the opening part 4A. For example, the hollowed-out shape of the opening part 4A can be cylindrical, quadrangular, or another shape. The side surface of the opening part 4A is the contact surface 5A, and it is more desirable that the contact surface 5A be smoothed so as to hold airtightness.

Figure 3:
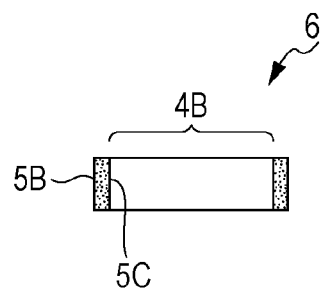
FIG. 3 is a cross-sectional schematic view illustrating a second member of the heating reaction container according to Embodiment 1 that exemplifies the present disclosure.

FIG. 3 schematically illustrates a cross section of the second member 6 along the vertical direction. The second member 6 is a tubular member. The second member 6 is inserted into the opening part 4A of the first member 1 and fitted in the first member 1. The second member 6 includes the annular contact surface 5B outside the second member 6 and includes the annular contact surface 5C inside the second member 6. The contact surfaces 5B and 5C are formed so as to be annularly integrated. For example, the second member 6 can hold the shape of its own independently and is not shaped like a film.

For example, the shape of the side surface of the second member 6 can be cylindrical, quadrangular, or another shape so as to suit the hollowed-out shape of the opening part 4A of the first member 1. The contact surface 5B on the outer circumference of the second member 6 is processed so as to have a radius that is slightly smaller than the radius of the contact surface 5A of the first member 1. It is more desirable that the contact surface 5B be smoothed so as to hold airtightness. In the present disclosure, the radius of each contact surface indicates a distance from the contact surface to the central axis that passes through the heating reaction container 10 in the vertical direction.

The inside of the second member 6 is a portion where a sealed structure is formed by the third member 7, which is described below, being inserted into the second member 6. The hollowed-out shape of the second member 6 may be, for example, cylindrical, quadrangular, or another shape. The side surface of the hollowed-out shape is the contact surface 5C. It is more desirable that the contact surface 5C be smoothed so as to hold airtightness.

Various materials resistant to a target reaction temperature are selectable as a second material that constitutes the second member 6. Specific examples include various kinds of metal, semimetal, carbon, and ceramic.

Figure 4:
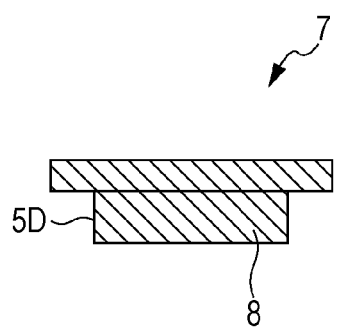
FIG. 4 is a cross-sectional schematic view illustrating a third member of the heating reaction container according to Embodiment 1 that exemplifies the present disclosure.

FIG. 4 schematically illustrates a cross section of the third member 7 along the vertical direction. The third member 7 is inserted into the second member 6. The third member 7 is a lid-like member that includes a projection 8. The projection 8 includes a contact surface that closes the opening part 4A and comes into contact with the space 3. The side surface of the projection 8 is the contact surface 5D, which is annular. For example, the shape of the projection 8 can be cylindrical, quadrangular, or another shape so as to suit the hollowed-out shape of the second member 6. The contact surface 5D on the outer circumference of the third member 7 is processed so as to have a diameter that is slightly smaller than the diameter of the contact surface 5C of the second member 6, that is, the diameter of the opening part 4B (see FIG. 3) of the second member 6. It is more desirable that the contact surface 5D be smoothed so as to hold airtightness.

Various materials resistant to a target reaction temperature are selectable as a third material that constitutes the third member 7. Specific examples include various kinds of metal, semimetal, carbon, and ceramic.

The relation among the thermal expansion coefficients of the first, second, and third materials is described below. When $\alpha 1$ represents the thermal expansion coefficient of the first material, $\alpha 2$ represents the thermal expansion coefficient of the second material, and $\alpha 3$ represents the thermal expansion coefficient of the third material, the relation $\alpha 3 > \alpha 2 > \alpha 1$, $\alpha 3 = \alpha 2 > \alpha 1$, or $\alpha 3 > \alpha 2 = \alpha 1$ is satisfied. In view of facilitating the assembly and maintenance and of ensuring the sealing through the thermal expansion, it is desirable that a material having a thermal expansion coefficient larger than the thermal expansion coefficient of the second material be selected as the third material and desirable that a material having a thermal expansion coefficient larger than the thermal expansion coefficient of the first material be selected as the second material.

FIG. 1 is referred to again. The heating reaction container 10 is utilized in a state where the first, second, and third members 1, 6, and 7 fit one another. In a state before the heating during which the members fit one another, the second member 6 is fitted in the first member 1 while the contact surface 5A of the first member 1 (see FIG. 2) and the contact surface 5B of the second member 6 (see FIG. 3) present further inside than the contact surface 5A face each other. In addition, the third member 7 is fitted in the second member 6 while the contact surface 5C of the second member 6 (see FIG. 3) and the contact surface 5D of the third member 7 (see FIG. 4) present further inside than the contact surface 5C face each other.

The space 3 is formed before the heating. A slight air gap, which is not illustrated, is present between the contact surface 5A and the contact surface 5B, and another slight air gap, which is not illustrated, is present between the contact surface 5C and the contact surface 5D.

The heating reaction container 10 assembled as depicted in FIG. 1 is placed in a heating apparatus, which is not illustrated, and the heating is started. For example, the heating apparatus is an electric furnace. With the heating, each of the first, second, and third members 1, 6, and 7 expands thermally. At the time, since the thermal expansion coefficient of the second material that constitutes the second member 6 is larger than the thermal expansion coefficient of the first material that constitutes the first member 1, the gap between the contact surfaces 5A and 5B gradually becomes smaller. As a result, the contact surfaces 5A and 5B come into intimate contact with each other.

Similarly, since the thermal expansion coefficient of the third material that constitutes the third member 7 is larger than the thermal expansion coefficient of the second material that constitutes the second member 6, the gap between the contact surfaces 5C and 5D gradually becomes smaller. As a result, the contact surfaces 5C and 5D come into intimate contact with each other. The space 3 is sealed accordingly. Thus, while preventing loss in material, which is caused by for example, vaporization resulting from the heating, and deterioration in material, which is caused by for example, oxidation, the reaction atmosphere can be ensured.

Even after the contact surfaces come into intimate contact, the heating reaction container 10 can be further heated. The heating reaction container 10 is heated to a design temperature that is necessary for the reaction. After that, predetermined holding time lapses. The process proceeds to a cooling procedure after the lapse of the predetermined holding time. The predetermined holding time can be determined when designed.

In the cooling procedure, each of the first, second, and third members 1, 6, and 7 shrinks. As the shrinking progresses, a gap appears between the contact surfaces 5A and 5B and another air gap appears between the contact surfaces 5C and 5D. Thus, after the cooling procedure, the first, second, and third members 1, 6, and 7 can be easily separated. In the end, the reaction product can be taken out from the space 3 of the first member 1.

The reaction product obtained through the $n^{th}$ heating reaction is taken out, and the first, second, and third members 1, 6, and 7 are cleaned when necessary. After that, another reaction raw material 2 can be placed in the space 3 again to perform the $(n+1)^{th}$ heating reaction. Pressure is applied over and over to the contact surface 5A at a high temperature by repeating the heating reaction in the sealed state. Thus, the radius of the contact surface 5A of the first member 1 increases gradually and the radius of the contact surface 5D of the third member 7 decreases gradually. As a result, initial dimensions of each member change.

After the heating reaction container 10 has been used repeatedly, the gaps among the contact surfaces before the heating may possibly be large. In such a case, the temperature at which the contact surfaces come into intimate contact and the space 3 is sealed becomes higher gradually. In an extreme case, the gaps may possibly remain even after the heating is performed to the design temperature necessary for the reaction. Thus, in the present embodiment, the second member 6 that is easily replaceable is provided so as to prevent the occurrence of an inconvenience for the reaction.

A heating reaction container without the second member 6 having a structure where the contact surface of the first member 1 and the contact surface of the third member 7 come into direct intimate contact with each other is now assumed. The gap between the contact surfaces before the heating can become larger gradually by repeatedly using the heating reaction container 10. In this case, a new first member 1 or a new third member 7 needs to be prepared again. As described above, the assumed container involves challenges concerning time for processing and preparing members and costs.

In contrast, the heating reaction container 10 according to the present embodiment includes the second member 6 that has a simple structure and can be easily prepared. Thus, even when the gaps among the contact surfaces before the heating become larger by repeatedly using the heating reaction container 10, it is sufficient to replace only the second member 6. Normally, the radius of the contact surface 5C on the inside of the second member 6 used for the replacement is slightly smaller than the radius of the second member 6 to be replaced, and the radius of the contact surface 5B on the outside of the second member 6 used for the replacement is slightly larger than the radius of the second member 6 to be replaced.

The dimensions of the second member 6 for the replacement can be estimated by calculating from the respective thermal expansion coefficients of the first material, the second material, and the third material. When certain temperature rising conditions are repeated, estimation based on an empirical rule is also possible. Replacing only the second member 6 without replacing the first member 1 and the third member 7, which are large, simplifies the working process. In addition, since a member for the replacement can be prepared easily, costs can be reduced.

Figure 5A:
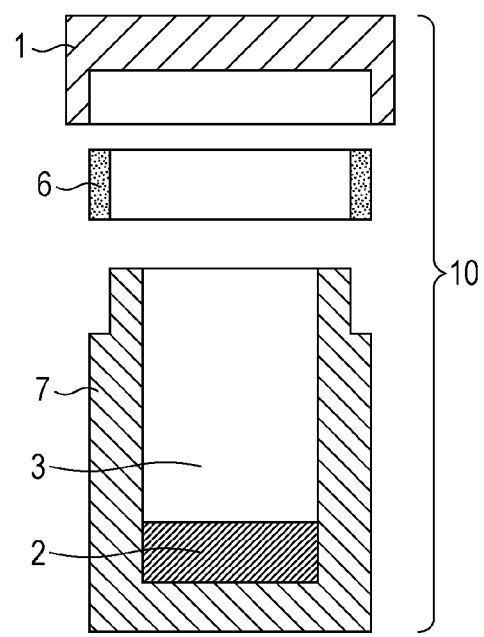
FIG. 5A is a cross-sectional schematic view illustrating a structure of a variation of the heating reaction container according to Embodiment 1 that exemplifies the present disclosure.
Figure 5B:
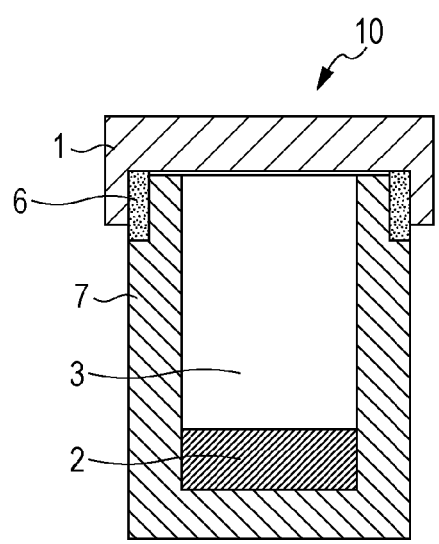
FIG. 5B is a cross-sectional schematic view illustrating a structure of the variation of the heating reaction container according to Embodiment 1 that exemplifies the present disclosure.

Each of FIGS. 5A and 5B schematically illustrates a cross section of a variation of the heating reaction container 10 along the vertical direction. FIG. 5A illustrates the heating reaction container 10 before the members are assembled and FIG. 5B illustrates the heating reaction container 10 after the members are assembled. In the present variation, the third member 7 is a body of the heating reaction container 10 having a hollow cylindrical shape and includes the space 3 for holding the reaction raw material 2. The second member 6 is a sealing member of the heating reaction container 10 and the first member 1 is a lid of the heating reaction container 10.

Whether the member that includes the space for holding the reaction raw material 2 is the first member 1 or the third member 7 can be selected as appropriate in view of avoiding unpremeditated reaction between the reaction raw material 2 and the first member 1 or the third member 7, ease of processing members, costs for members, and the like. The second member 6 can be replaced easily by causing the third member 7 to include the space for holding the reaction raw material 2. Furthermore, entries of foreign substances into the space can be reduced by causing the third member 7 to include the space for holding the reaction raw material 2.

[1.2. Reaction Method]

A (heating) reaction method of the present embodiment, which is performed using the heating reaction container 10, is described below.

As illustrated in FIG. 1, the reaction raw material 2 is placed in the space 3 of the first member 1. After inserting the second member 6 and the third member 7, the heating reaction container 10 is placed in an electric furnace, and heating is performed to raise the temperature in accordance with a temperature program suitable for the reaction. After the heating reaction container 10 is heated to a design temperature that is necessary for the reaction, predetermined holding time lapses. The process proceeds to a cooling procedure after the lapse of the predetermined holding time. The predetermined holding time can be determined when designed.

After the completion of the cooling, the first member 1, the second member 6, and the third member 7 are separated and the reaction product is taken out from the space 3 of the first member 1. As described above, a material can be produced through heating reaction in sealed space. Also when the structure in FIG. 5B is used, similarly, a material can be produced through heating reaction in sealed space.

An embodiment is described below.

In the heating reaction container 10 illustrated in FIG. 1, molybdenum (Mo) is used as the first material, C-276 alloy (Ni: 57 wt %, Cr: 16 wt %, Mo: 16 wt %, W: 4 wt %, Fe: 5 wt %, Co<2.5 wt %, V<0.35 wt %, Mn<1 wt %, Si<0.08 wt %, C<0.01 wt %) is used as the second material, and SUS316 alloy is used as the third material. The thermal expansion coefficients of the first, second, and third materials are 4.8 micron/m/° C., 12.0 micron/m/° C., and 16.0 micron/m/° C., respectively.

The diameter of the contact surface 5A of the first member 1 is set to 35.520 mm. The diameter of the contact surface 5B on the outside of the second member 6 is set to 35.510 mm and the diameter of the contact surface 5C on the inside of the second member 6 is set to 30.510 mm. The diameter of the contact surface 5D of the third member 7 is set to 30.495 mm. The contact surfaces 5A to 5D are set to be cylindrical side surfaces that each have a height of 10 mm.

The second member 6 is inserted into the first member 1 and the third member 7 is inserted into the second member 6. After that, the heating reaction container 10 is heated in a nitrogen atmosphere using the electric furnace to 600° C. at a temperature rising speed of 100° C./hr. The heating reaction can be performed in a sealed atmosphere by stopping the heating after a six-hour retention and causing the heating reaction container 10 to undergo self-cooling.

A small dimensional change can be caused in the heating reaction container 10 after use. When only the second member 6 with a simple ring shape is prepared and used for the replacement so as to keep the sealing temperature at a constant value in repeatedly using the heating reaction container 10, the same sealed heating reaction can be repeated over and over again.

In the structure illustrated in FIG. 5, Mo is used as the first material and C-276 alloy (Ni: 57 wt %, Cr: 16 wt %, Mo: 16 wt %, W: 4 wt %, Fe: 5 wt %, Co<2.5 wt %, V<0.35 wt %, Mn<1 wt %, Si<0.08 wt %, C<0.01 wt %) is used as the second and third materials.

The diameter of the contact surface 5A of the first member 1 is set to 65.520 mm. The diameter of the contact surface 5B on the outside of the second member 6 is set to 65.510 mm and the diameter of the contact surface 5C on the inside of the second member 6 is set to 58.510 mm. The diameter of the contact surface 5D of the third member 7 is set to 58.500 mm. The contact surfaces 5A to 5D are set to be cylindrical side surfaces that each have a height of 10 mm.

The third member 7 is inserted into the second member 6 and the second member 6 is inserted into the first member 1. After that, the heating reaction container 10 is heated in a nitrogen atmosphere using the electric furnace to 1000° C. at a temperature rising speed of 100° C./hr. The heating reaction can be performed in a sealed atmosphere by stopping the heating after a five-hour retention and causing the heating reaction container 10 to undergo self-cooling.

Since the second material and the third material are the same as each other, the gap between the contact surface 5C of the second member 6 and the contact surface 5D of the third member 7 remains almost constant until a halfway point of the heating. However, after the contact surface 5B on the outer circumference of the second member 6 and the contact surface 5A of the first member 1 come into intimate contact with each other, the thermal expansion of the second member 6 is suppressed. Thus, the gap between the contact surfaces 5C and 5D becomes smaller gradually, and after that, the contact surface 5C comes into intimate contact with the contact surface 5D. The intimate contact between the contact surface 5B and the contact surface 5A occurs in a range from approximately 300° C. to approximately 400° C.

A small dimensional change can be caused in the heating reaction container 10 after use. When only the second member 6 with a simple ring shape is prepared and used for the replacement so as to keep the sealing temperature at a constant value in repeatedly using the heating reaction container 10, the same sealed heating reaction can be repeated over and over again.

Although the present embodiment and the variations thereof are described as specific aspects of the present disclosure, the present disclosure is not limited thereto. Each contact surface of the first member 1, the second member 6, and the third member 7 may be different from the cylindrical side surface. For example, each of such contact surfaces can be a side surface of a polygonal prism. The space 3 for holding the reaction raw material 2 may be formed by combining the first member 1, the second member 6, the third member 7, and a fourth member different from the first to third members 1, 6, and 7.

(A) Before the heating reaction, the diameter of the cylindrical shape formed by the contact surface 5A of the first member 1 of the heating reaction container, which may be hereinafter referred to simply as the diameter of the contact surface 5A, is larger than or equal to the diameter of the cylindrical shape formed by the contact surface 5B on the outside of the second member 6, which may be hereinafter referred to simply as the diameter of the contact surface 5B. (B) Before the heating reaction, the diameter of the cylindrical shape formed by the contact surface 5C on the inside of the second member 6 of the heating reaction container, which may be hereinafter referred to simply as the diameter of the contact surface 5C, is larger than or equal to the diameter of the cylindrical shape formed by the contact surface 5D of the third member 7, which may be hereinafter referred to simply as the diameter of the contact surface 5D. (C) In the heating reaction, the first, second, and third members 1, 6, and 7 expand with the respective expansion coefficients, and the contact surfaces 5A and 5B come into intimate contact with each other and the contact surfaces 5C and 5D come into intimate contact with each other. Accordingly, the diameters of the contact surfaces 5A and 5B are equal to each other and the diameters of the contact surfaces 5C and 5D are equal to each other. As long as the above-described conditions (A), (B), and (C) are satisfied, each size of the respective diameters of the contact surfaces 5A, 5B, and 5C is not limited in particular.

Also when the expansion coefficients of the first and second members 1 and 6 are the same as each other and when before the heating reaction, the diameter of the contact surface 5A of the first member 1 of the heating reaction container is larger than the diameter of the contact surface 5B on the outside of the second member 6, the second member 6 comes into intimate contact with the first member 1 in the heating reaction by being pushed by the third member 7 with the larger expansion coefficient. That is, the contact surfaces 5A and 5B come into intimate contact with each other. Also when the expansion coefficients of the second and third members 6 and 7 are the same as each other and when before the heating reaction, the diameter of the contact surface 5C on the inside of the second member 6 of the heating reaction container is larger than the diameter of the contact surface 5D of the third member 7, the second member 6 comes into intimate contact with the third member 7 in the heating reaction by being suppressed by the first member 1 with the smaller expansion coefficient. That is, the contact surfaces 5C and 5D come into intimate contact with each other.

Each of the respective diameters of the contact surfaces 5A and 5B before the heating reaction may be changed as appropriate in accordance with the quantity of the reaction material or another condition. Specifically, each of the respective diameters of the contact surfaces 5A and 5B before the heating reaction may be set to approximately 12 mm, and each of the respective diameters of the contact surfaces 5C and 5D before the heating reaction may be set to approximately 10 mm. It is also possible to set each of the respective diameters of the contact surfaces 5A and 5B before the heating reaction to approximately 600 mm and to set each of the respective diameters of the contact surfaces 5C and 5D before the heating reaction to approximately 540 mm.

When the diameters are large (e.g. when the outside diameter is approximately 600 mm), the second member can be manufactured by shaving for example. In terms of the efficiency of material utilization and/or processing time, it is also effective to manufacture the second member 6 by another method. Specifically, for example, the second member 6 can be manufactured by cutting a pipe-shaped material. The first and third member 1 and 7 can be manufactured by welding a pipe-shaped material and a disc-shaped material.

When each diameter of the contact surfaces 5A to 5D of the first, second, and third members 1, 6, and 7 of the heating reaction container is large, such as approximately 600 mm, the absolute value of the difference in dimensional change among the first, second, and third members 1, 6, and 7, which is caused by the thermal expansion, is also large. Thus, even when the difference between the diameter of the contact surface 5A of the first member 1 and the diameter of the contact surface 5B on the outside of the second member 6 before the heating reaction, and the difference between the diameter of the contact surface 5C on the inside of the second member 6 and the diameter of the contact surface 5D of the third member 7 before the heating reaction are increased, the functions of the present disclosure can be exhibited as long as the above-described conditions are satisfied. When the difference between the diameter of the contact surface 5A of the first member 1 and the diameter of the contact surface 5B on the outside of the second member 6 and the difference between the diameter of the contact surface 5C on the inside of the second member 6 and the diameter of the contact surface 5D of the third member 7 are large, it is advantageous in that the heating reaction container can be assembled easily.

Figure 13:
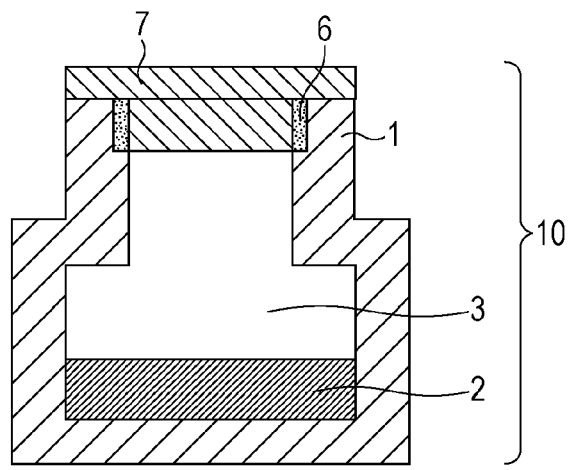
FIG. 13 is a cross-sectional schematic view illustrating a structure of another variation of the heating reaction container according to Embodiment 1 that exemplifies the present disclosure.

When the diameters of the contact surfaces 5A to 5D of the first, second, and third members 1, 6, and 7 of the heating reaction container are large, the second member 6 for replacement is also large. When a portion for holding a reaction raw material 2 in a first member 1 (i.e. an inner space 3) has a cylindrical shape, a diameter of an opening may be smaller than a diameter of the inner space 3, as shown in FIG. 13. Thereby, the replacement component becomes smaller, and thus, the costs are reduced and/or workability is improved. That is, only a portion through which the material is put in or taken out can be made small. The shape of the inner space 3 of the first member 1 is not limited in particular and may be a shape other than the cylindrical shape, such as a circular frustum shape, a polygonal prism shape, or a polygonal frustum shape. In this case, for example, a cross section of the inner space 3 of the first member 1, which is parallel to the opening, is larger than the area of the opening. A case where the third member 7 includes the portion for holding the reaction raw material 2 like illustrated in FIG. 5B is similar. That is, the shape of the inner space 3 of the third member 7 is not limited in particular and may be a cylindrical shape, a circular frustum shape, a polygonal prism shape, a polygonal frustum shape, or the like. In this case, for example, a cross section of the inner space 3 of the third member 7, which is parallel to the opening, is larger than the area of the opening. Accordingly, the second member 6 can be downsized, costs can be reduced, and the workability can be enhanced.

The shape formed by the contact surfaces 5A to 5D of the first to third members 1, 6, and 7 of the heating reaction container is not limited in particular and may be different from the cylindrical shape. The shape formed by the contact surfaces 5A to 5D may be for example, a circular frustum shape, polygonal prism shape, or a polygonal frustum shape. The shape formed by the contact surfaces 5A and 5B may be different from the shape formed by the contact surfaces 5C and 5D.

When the shape formed by the contact surfaces 5A and 5B of the first and second members 1 and 6 is a frustum shape, before the heating reaction, the diameter of the frustum shape formed by the contact surface 5A of the first member 1 is, in a cross section at any height, larger than or equal to the diameter of the cylindrical shape formed by the contact surface 5B of the second member 6. When the shape formed by the contact surfaces 5C and 5D of the second member 6 and the third member 7 is a frustum shape, before the heating reaction, the diameter of the frustum shape formed by the contact surface 5C of the second member 6 is, in a cross section at any height, larger than or equal to the diameter of the cylindrical shape formed by the contact surface 5D of the third member 7. In the shape illustrated in FIG. 1, when the shape formed by the contact surfaces 5A to 5D is a frustum shape where the diameter decreases toward the bottom surface of the first member 1, the second member 6 can be replaced easily. In the shape illustrated in FIG. 5A, when the shape formed by the contact surfaces 5A to 5D is a frustum shape where the diameter increases toward the bottom surface of the third member 7, the second member 6 can be replaced easily.

Although in the present embodiment, the example where Mo is used as the first material, C-276 alloy is used as the second material, and SUS316 alloy is used as the third material is described, the combinations of the first to third materials are not limited thereto. The first member 1, the second member 6, and the third member 7 may be formed from materials different from one another. For example, the first material and the second material may be the same as each other, or the second material and the third material may be the same as each other.

As described above, the first, second, and third members 1, 6, and 7 can be constituted using Mo, C-276 alloy, SUS316 alloy, and the like. Instead, the first, second, and third members 1, 6, and 7 can be constituted of at least one selected from a group consisting of for example, niobium, tantalum, and nickel. To prevent reaction with the reaction raw material 2 held inside and any of the first, second, and third members 1, 6, and 7 or to reduce high-temperature oxidation, ceramic coating may be performed on at least one of the first, second, and third members 1, 6, and 7.

According to the present embodiment, with a simple structure, sealing can be performed at a high temperature, reaction of the prepared raw material 2 provided in the heating reaction container 10 can be advanced, and the reaction can be repeated at low cost.

Embodiment 2

A heating reaction container 10 according to Embodiment 2 is described with reference to FIGS. 6A to 12B and 14.
[2.1. Heating Reaction Container 10]

Figure 6A:
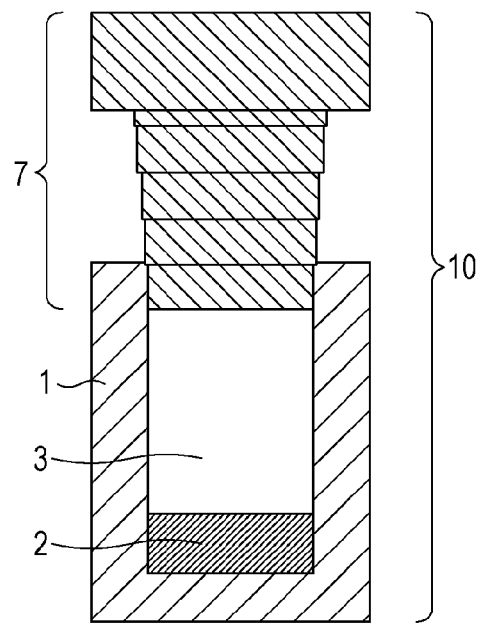
FIG. 6A is a cross-sectional schematic view illustrating a structure of a heating reaction container according to Embodiment 2 that exemplifies the present disclosure.
Figure 6B:
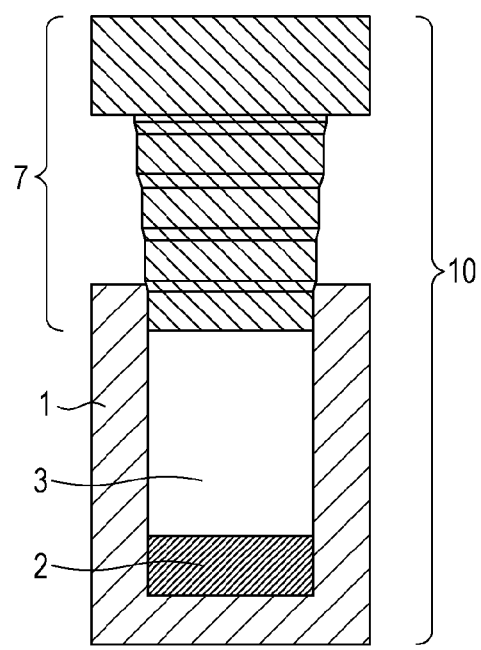
FIG. 6B is a cross-sectional schematic view illustrating a structure of the heating reaction container according to Embodiment 2 that exemplifies the present disclosure.

Each of FIGS. 6A and 6B schematically illustrates a cross section of the heating reaction container 10 according to Embodiment 2 along the vertical direction. FIG. 6B illustrates the heating reaction container 10, which includes a second member 7 including one or more tapered surfaces and a plurality of contact surfaces. That is, one or more surfaces of the second member 7 are processed to be tapered. The details of this structure are described below.

The heating reaction container 10 includes a first member 1 and the second member 7. The first member 1 is a body of the heating reaction container 10 having a hollow cylindrical shape and includes a space 3 for holding a reaction raw material 2. The second member 7 is a lid of the heating reaction container 10.

Figure 7:
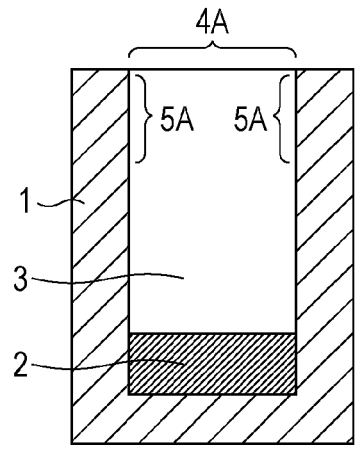
FIG. 7 is a cross-sectional schematic view illustrating a first member of the heating reaction container according to Embodiment 2 that exemplifies the present disclosure.

FIG. 7 schematically illustrates a cross section of the first member 1 along the vertical direction. The first member 1 includes a contact surface 5A, which is annular, and another contact surface, which comes into contact with the reaction raw material 2, inside the first member 1. The first member 1 further includes an opening part 4A in an upper portion of the first member 1. Various materials resistant to a target reaction temperature are selectable as a first material that constitutes the first member 1. Specific examples include various kinds of metal, semimetal, carbon, and ceramic.

The opening part 4A is a portion where a sealed structure is formed by the second member 7, which is described below, being inserted into the opening part 4A. For example, the hollowed-out shape of the opening part 4A can be cylindrical, quadrangular, or another shape. The side surface of the opening part 4A is a contact surface 5A, and it is more desirable that the contact surface 5A be smoothed so as to hold airtightness.

Figure 8A:
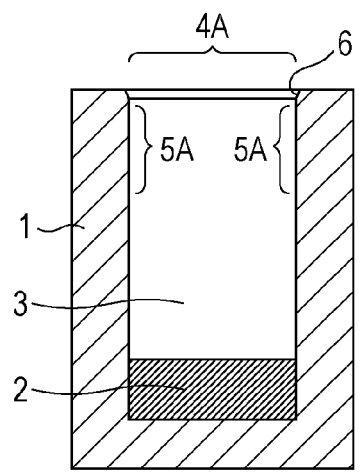
FIG. 8A is a cross-sectional schematic view illustrating the first member of the heating reaction container according to Embodiment 2 that exemplifies the present disclosure in a case where the first member includes a tapered surface.
Figure 8B:
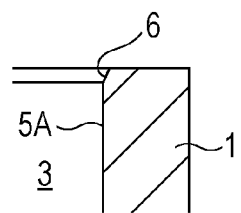
FIG. 8B is a cross-sectional schematic view illustrating the tapered surface through enlargement.

FIG. 8A schematically illustrates a cross section of the first member 1 including a tapered surface 6 along the vertical direction. That is, the first member 1 includes a surface processed to be tapered. FIG. 8B illustrates the tapered surface 6 through enlargement. The sealing properties in the cooling procedure after the end of the heating is increased by causing an edge portion of the hollowed-out shape of the opening part 4A to have the tapered surface 6 as illustrated in FIGS. 8A and 8B.

Figure 9A:
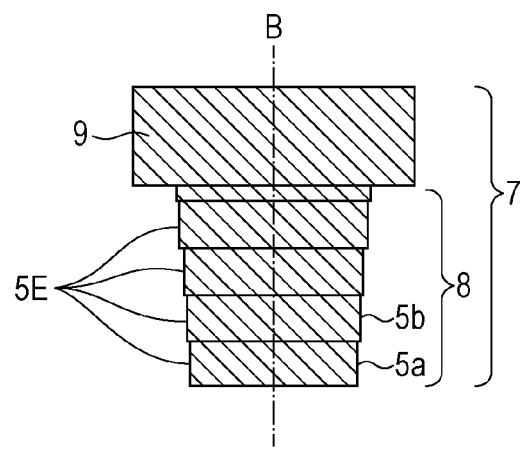
FIG. 9A is a cross-sectional schematic view illustrating a second member of the heating reaction container according to Embodiment 2 that exemplifies the present disclosure.
Figure 9B:
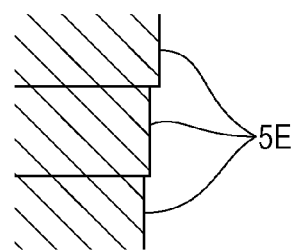
FIG. 9B is a cross-sectional schematic view illustrating a stair-like contact surface that includes a plurality of contact surfaces through enlargement.

FIG. 9A schematically illustrates a cross section of the second member 7 along the vertical direction. FIG. 9B illustrates a stair-like contact surface including a plurality of contact surfaces 5E with which a projection 8 of the second member 7 is provided through enlargement. The second member 7 is inserted into the first member 1 and fitted therein. The second member 7 is a lid-like member that includes the projection 8. The projection 8 closes the opening part 4A and includes a contact surface that comes into contact with the space 3. The side surface of the projection 8 includes a plurality of steps among the plurality of contact surfaces 5E. That is, each of the steps exists between two adjacent contact surfaces 5E among the plurality of contact surfaces 5E. In the present disclosure, the shape of such a side surface is referred to as a stair-like shape. The "stair-like contact surface" indicates a structure that includes the plurality of contact surfaces 5E and the plurality of steps. Each of the plurality of contact surfaces 5E is formed so as to be annular. For example, the shape of the projection 8 can be cylindrical, quadrangular, or another shape so as to suit the hollowed-out shape of the first member 1.

The distance from each of the plurality of contact surfaces 5E to an axis B that passes through the second member 7 in the vertical direction varies. The axis B also passes through the space 3 of the heating reaction container 10. The distance from each contact surface 5E to the axis B decreases in stages as the contact surface 5E is positioned farther from a body 9 of the second member 7. In other words, when the axis B is the central axis that passes through the second member 7, the radius of each contact surface 5E decreases in stages as the contact surface 5E is positioned farther from the body 9 of the second member 7. The contact surface 5E farthest from the body 9 of the second member 7, which is hereinafter referred to as a "contact surface 5a", is processed so that the radius of the contact surface 5a is slightly smaller than the radius of the contact surface 5A of the opening part 4A of the first member 1. The contact surface 5E adjacent to the farthest contact surface 5a, which is hereinafter referred to as a "contact surface 5b", is processed so that the radius of the contact surface 5b is slightly larger than the radius of the contact surface 5A of the opening part 4A of the first member 1.

Various materials resistant to a target reaction temperature are selectable as a second material that constitutes the second member 7. Specific examples include various kinds of metal, semimetal, carbon, and ceramic. It is more desirable that the plurality of contact surfaces 5E be smoothed so as to hold airtightness.

Figure 10A:
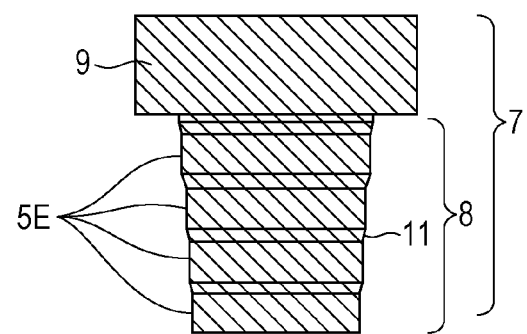
FIG. 10A is a cross-sectional schematic view illustrating the second member of the heating reaction container according to Embodiment 2 that exemplifies the present disclosure.
Figure 10B:
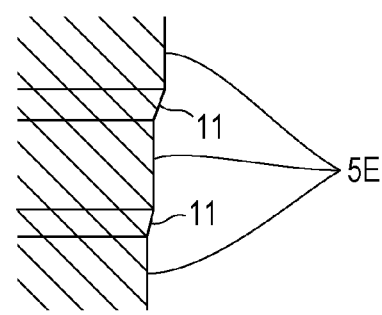
FIG. 10B is a cross-sectional schematic view illustrating a stair-like contact surface that includes the plurality of contact surfaces through enlargement.

FIG. 10A schematically illustrates a cross section of the second member 7, which includes a stair-like contact surface including one or more tapered surfaces 11 and the plurality of contact surfaces 5E along the vertical direction. FIG. 10B illustrates the tapered surfaces 11 through enlargement. The plurality of contact surfaces 5E include the tapered surfaces 11 among the plurality of contact surfaces 5E in edge portions of the steps. The tapered surface 11 increases the sealing properties in the cooling procedure after the end of the heating.

The relation between the thermal expansion coefficients of the first and second materials is described below. The thermal expansion coefficient of the second material that constitutes the second member 7 is larger than the thermal expansion coefficient of the first material that constitutes the first member 1.

FIG. 6A or 6B is referred to again. The heating reaction container 10 is utilized in a state where the second member 7 and the first member 1 fit each other. In the state where the members fit each other and before the heating is performed for the first time, the contact surface 5A of the first member 1 can face one of the plurality of contact surfaces 5E of the second member 7, which is largest in radius among the contact surfaces 5E smaller in cross sectional shape than the contact surface 5A of the first member 1.

In FIG. 6A or 6B, the contact surface 5E that is selected as the contact surface smallest in radius is illustrated as the contact surface 5a (see FIG. 9A). Specifically, the second member 7 is fitted in the first member 1 while the contact surface 5a of the second member 7 and the contact surface 5A of the first member 1 present further outside than the contact surface 5a face each other. The space 3 is formed before the heating. A slight air gap is present between the contact surface 5A and the contact surface 5a.

The heating reaction container 10 assembled as depicted in FIG. 6A or 6B is placed in a heating apparatus, which is not illustrated, and the heating is started. For example, the heating apparatus is an electric furnace. With the heating, each of the second member 7 and the first member 1 expands thermally. At the time, since the thermal expansion coefficient of the second material that constitutes the second member 7 is larger than the thermal expansion coefficient of the first material that constitutes the first member 1, the gap between the contact surfaces 5A and 5a gradually becomes smaller. As a result, the contact surfaces 5A and 5a come into intimate contact with each other and the space 3 is sealed. Accordingly, while preventing loss in material, which is caused by for example, vaporization resulting from the heating, and deterioration in material, which is caused by for example, oxidation, the reaction atmosphere can be ensured.

Even after the contact surfaces come into intimate contact, the heating reaction container 10 can be further heated. The heating reaction container 10 is heated to a design temperature that is necessary for the reaction. After that, predetermined holding time lapses. The process proceeds to the cooling procedure after the lapse of the predetermined holding time. The predetermined holding time can be determined when designed.

In the cooling procedure, each of the first member 1 and the second member 7 shrinks. As the shrinking progresses, a gap appears between the contact surfaces 5A and 5a. Thus, after the cooling process, the first member 1 and the second member 7 can be easily separated. In the end, the reaction product can be taken out from the space 3 of the first member 1.

The reaction product obtained by performing the $n^{th}$ heating reaction is taken out, and the first member 1 and the second member 7 are cleaned when necessary. After that, another reaction raw material 2 can be placed in the space 3 again to perform the $(n+1)^{th}$ heating reaction. Pressure is applied over and over to the contact surface 5A at a high temperature by repeating the heating reaction in the sealed state. Thus, the radius of the contact surface 5A of the first member 1 increases gradually and the radius of the contact surface 5a of the second member 7 decreases gradually. As a result, initial dimensions of each member change.

After the heating reaction container 10 has been used repeatedly, the gap between the contact surfaces before the heating may possibly be large. In such a case, the temperature at which the contact surfaces come into intimate contact and the space 3 is sealed becomes higher gradually. In an extreme case, the gap may possibly remain even after the heating is performed to the design temperature necessary for the reaction. In the present embodiment, the contact surfaces 5E of the second member 7 are structured like stairs so as to prevent the occurrence of an inconvenience for the reaction.

Figure 11A:
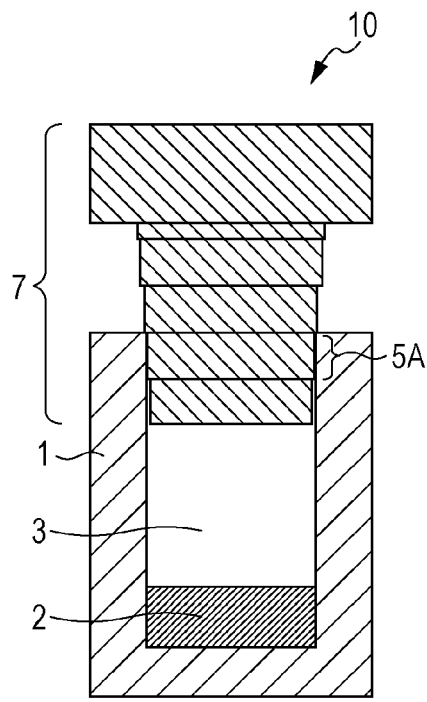
FIG. 11A is a cross-sectional schematic view illustrating a structure of the heating reaction container according to Embodiment 2 that exemplifies the present disclosure.
Figure 11B:
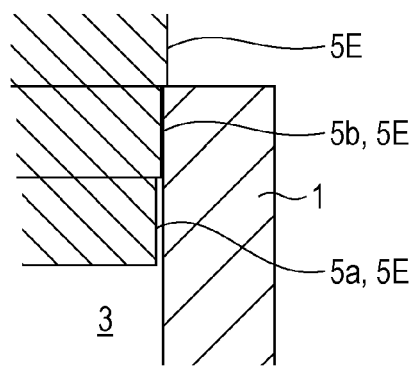
FIG. 11B is a cross-sectional schematic view illustrating part of the plurality of contact surfaces through enlargement.

FIG. 11A schematically illustrates a cross section of the heating reaction container 10 along the vertical direction in a state where the contact surface 5b included in the plurality of contact surfaces 5E faces the contact surface 5A. FIG. 11B illustrates the contact surface 5b through enlargement. It is assumed that the radius of the contact surface 5a that has been used in the heating reaction for n times is estimated to be too small for the formation of the sealed space in the $(n+1)^{th}$ heating reaction. In this case, the contact surface 5b at the subsequent stair, which is adjacent to the contact surface 5a, can be used. Accordingly, it can be avoided that the gap between the contact surface 5E and the contact surface 5A is too large before the heating. Through the heating, the contact surface 5A and the contact surface 5b can come into intimate contact with each other and the space 3 can be sealed.

For example, considered now is a case where the plurality of contact surfaces 5E constitute part of a contact surface that is shaped like stairs, the number of which is M. In this case, the heating reaction container 10 can be repeatedly utilized for the maximum times of N×M through all of the stairs when the heating reaction is performed repeatedly for the first to N-th times using the corresponding contact surface at each stair. When the heating reaction is repeated, for example, the contact surfaces 5E of the second member 7 can be designed so as to suit the shape obtained after cleaning the contact surface 5A of the first member 1. As described above, the first member 1 can be continued to be used by utilizing the second member 7. As a result, costs for members can be reduced.

Figure 12A:
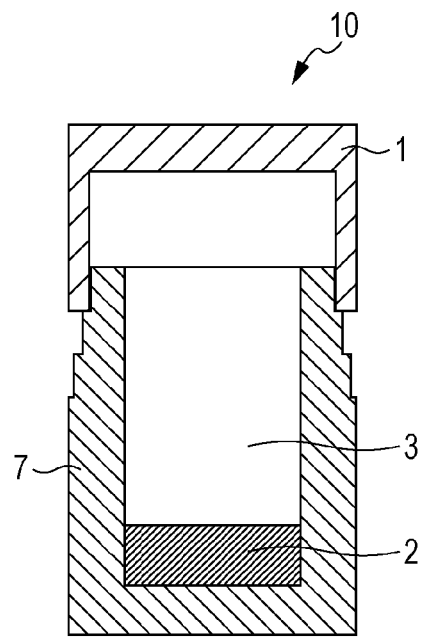
FIG. 12A is a cross-sectional schematic view illustrating a structure of a variation of the heating reaction container according to Embodiment 2 that exemplifies the present disclosure.
Figure 12B:
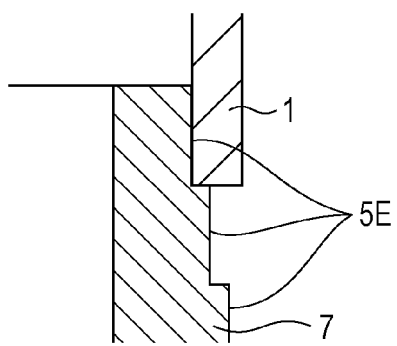
FIG. 12B is a cross-sectional schematic view illustrating a contact surface of a first member of the variation of the heating reaction container according to Embodiment 2 that exemplifies the present disclosure through enlargement.

FIG. 12A schematically illustrates a cross section of a variation of the heating reaction container 10 according to the present embodiment along the vertical direction. FIG. 12B illustrates the contact surface 5A through enlargement. In the present variation, the first member 1 is a lid of the heating reaction container 10. The second member 7 is a body of the heating reaction container 10 having a hollow cylindrical shape and includes the space 3 for holding the reaction raw material 2.

Whether the member that includes the space for holding the reaction raw material 2 is the first member 1 or the second member 7 can be selected as appropriate in view of avoiding unpremeditated reaction between the reaction raw material 2 and the first member 1 or the second member 7, ease of processing members, costs for members, and the like. In the present variation, the second member 7 includes a stair-like contact surface that includes the plurality of contact surfaces 5E. As described above, the stair-like contact surface can be formed outside the body of the heating reaction container 10.

In an early stage of the cooling procedure, the heating reaction container 10 and the reaction raw material 2 can be still at a high temperature. Thus, it is desirable that the space 3 be maintained in the sealed state as much as possible so as to prevent reaction with outside air. The sealing properties in the cooling procedure can be enhanced by causing the edge portion of the hollowed-out shape of the opening part 4A and each step between the adjacent contact surfaces in the plurality of contact surfaces 5E to have the tapered surfaces, which are smooth, as illustrated in FIGS. 8A and 10A. Also in the variation illustrated in FIG. 12A, similar to the present embodiment, the first member 1 and the second member 7 can be provided with such tapered surfaces, which are smooth.

In the cooling procedure, each of the first member 1 and the second member 7 shrinks. As the shrinking progresses, a gap can appear between the contact surface 5A of the first member 1 and each contact surface of the second member 7. Thus, without any tapered surface, the sealing properties would be lost.

With the tapered surface, even when a gap appears between the contact surfaces that face each other, the state of the space 3 is under positive pressure, gas in the space 3 is released until the pressure becomes atmospheric pressure. After that, in the cooling procedure, the tapered surface functions as the sealing surface and the state of the space 3 is held under negative pressure. When the state of the space 3 is under negative pressure, no gas is released and in the cooling procedure, the tapered surface functions as the sealing surface, and the state of the space 3 is held under negative pressure. In both cases, in the cooling procedure, the state of the space 3 is held under negative pressure.

[2.2. Reaction Method]

A (heating) reaction method of the present embodiment, which is performed using the heating reaction container 10, is described below.

As illustrated in FIG. 6A or 6B, the reaction raw material 2 is placed in the space 3 of the first member 1. After inserting the second member 7, the heating reaction container 10 is placed in an electric furnace, and heating is performed to raise the temperature in accordance with a temperature program suitable for the reaction. After the heating reaction container 10 is heated to a design temperature that is necessary for the reaction, predetermined holding time lapses. The process proceeds to a cooling procedure after the lapse of the predetermined holding time. The predetermined holding time can be determined when designed.

After the completion of the cooling, the first member 1 and the second member 7 are separated and the reaction product is taken out from the space 3 of the first member 1. As described above, a material can be produced through heating reaction in sealed space. Also when the structure in FIG. 12A is used, similarly, a material can be produced through heating reaction in sealed space.

An embodiment is described below. In the structure illustrated in FIGS. 6A and 6B, Mo is used as the second material and C-276 alloy (Ni: 57 wt %, Cr: 16 wt %, Mo: 16 wt %, W: 4 wt %, Fe: 5 wt %, Co<2.5 wt %, V<0.35 wt %, Mn<1 wt %, Si<0.08 wt %, C<0.01 wt %) is used as the first material.

The diameter of the contact surface 5A of the first member 1 is set to 30.510 mm. The diameter of the contact surface 5a of the second member 7 is set to 30.495 mm. The contact surfaces 5A and 5a are set to be cylindrical side surfaces that each have a height of 10 mm.

The second member 7 is inserted into the first member 1. After that, the heating reaction container 10 is heated in a nitrogen atmosphere using the electric furnace to 1000° C. at a temperature rising speed of 100° C./hr. The heating reaction is performed for predetermined times by an operational method by which the heating is stopped after an eight-hour retention and the heating reaction container 10 is caused to undergo self-cooling. After the heating reaction container 10 that has been used returns to room temperature, for example, the diameter of the contact surface 5A of the first member 1 is 30.649 mm and the diameter of the contact surface 5a of the second member 7 is 30.475 mm.

Before use, the difference between the diameter of the contact surface 5A of the first member 1 and the diameter of the contact surface 5a of the second member 7 is 0.015 mm.

After use, the difference is increased to 0.174 mm for example. Thus, when the contact surfaces 5E of the second member 7 are designed under these heating reaction conditions, it is desirable that while setting the diameter of the contact surface 5a at the first stair to 30.495 mm, the diameter of the contact surface 5b at the second stair be set to 30.634 mm. Accordingly, the heating reaction can be performed using the contact surface 5b at the second stair with the degree of the sealing equivalent to the degree of the sealing obtained when the contact surface 5a at the first stair is used.

Similarly, the proper diameter for the contact surface at the third stair can be estimated to be approximately 30.773 mm, which equals 30.634 mm+(30.634 mm−30.495 mm), and the proper diameter for the contact surface at the fourth stair can be estimated to be approximately 30.912 mm.

The diameter of each of the multistair contact surfaces 5E can be designed on the basis of experimental values as described above. For example, design based on material physical property values is also possible. An approximate temperature at which the space 3 enters the sealed state can be designed using the diameter of each contact surface and the difference between the first material and the second material in thermal expansion coefficient. Thus, on the basis of the lowest temperature necessary for the sealing, a gap between each of the contact surfaces 5E of the second member 7 and the contact surface 5A of the first member 1, which is allowable at room temperature, that is, an allowable air gap can be roughly estimated. By applying the value of the allowable air gap to each step of the multistair contact surfaces 5E of the second member 7, the value of the gap can be made equal to or less than a certain value. That is, each step between the adjacent contact surfaces included in the plurality of contact surfaces 5E has a value equal to or less than a predetermined value obtained by calculation based on the sealing conditions. As a result, the temperature at which the space 3 reaches the sealed state is caused to be equal to or less than a predetermined temperature. An example of the rough estimate of the allowable air gap is introduced below.

The diameter of the cylindrical shape formed by the contact surface 5A of the first member 1 of the heating reaction container, which may be hereinafter referred to simply as the diameter of the contact surface 5A, and the diameter of the cylindrical shape formed by the contact surface 5a of the second member 7, which may be hereinafter referred to simply as the diameter of the contact surface 5a, before the heating reaction may be changed as appropriate in accordance with the quantity of the reaction material or another condition. Specifically, the diameters of the contact surfaces 5A and 5a before the heating reaction can each be set to approximately 10 mm or approximately 600 mm. When the diameter is large, such as approximately 600 mm, the first member can be manufactured by shaving for example. In terms of the efficiency of material utilization and/or processing time, it is also effective to manufacture the first member 1 by another method. Specifically, for example, the first member 1 can be manufactured by press-fitting a disc-shaped material into a pipe-shaped material. The second member 7 can be manufactured by welding a disc-shaped material.

When the diameter of the contact surface 5A of the first member 1 and the diameter of the contact surface 5a of the second member 7 are each large, such as approximately 600 mm, the absolute value of the difference in dimensional change between the first member 1 and the second member 7, which is caused by the thermal expansion, is also large. Thus, even when the difference between the diameter of the contact surface 5A of the first member 1 and the diameter of the contact surface 5a of the second member 7 before the heating reaction is increased, the functions of the present disclosure can be exhibited. When the difference between the diameter of the contact surface 5A of the first member 1 and the diameter of the contact surface 5a of the second member 7 is large, it is advantageous in that the heating reaction container can be assembled easily.

Figure 14:
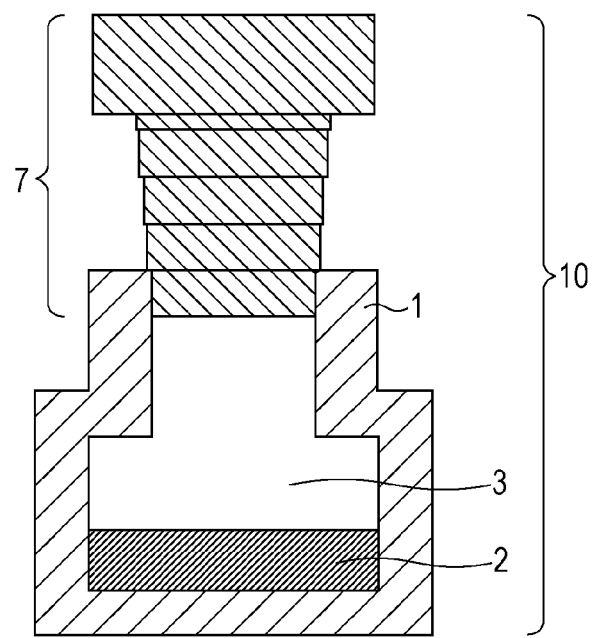
FIG. 14 is a cross-sectional schematic view illustrating a structure of another variation of the heating reaction container according to Embodiment 2 that exemplifies the present disclosure.

When the diameter of the contact surface 5A of the first member 1 and the diameter of the contact surface 5a of the second member 7 are large, the second member 7 that has a large size is necessary for the replacement. When a portion for holding a reaction raw material 2 in the first member 1 (i.e. an inner space 3) has a cylindrical shape a diameter of an opening may be smaller than the diameter of the inner space 3, as shown in FIG. 14. Thereby, the replacement component becomes smaller, and thus, the costs are reduced and/or workability is improved. That is, only a portion through which the material is put in or taken out can be made small. The shape of the inner space 3 of the first member 1 is not limited in particular and may be a shape other than the cylindrical shape, such as a circular frustum shape, a polygonal prism shape, or a polygonal frustum shape. In this case, for example, a cross section of the inner space 3 of the first member 1, which is parallel to the opening, is larger than the area of the opening. Accordingly, the second member 7 can be downsized, costs can be reduced, and the workability can be enhanced. A case where the second member 7 includes the portion for holding the material like illustrated in FIG. 12A is similar. That is, the shape of the inner space of the second member 7 is not limited in particular and may be a cylindrical shape, a circular frustum shape, a polygonal prism shape, a polygonal frustum shape, or the like. In this case, for example, a cross section of the inner space 3 of the second member 7, which is parallel to the opening, is larger than the area of the opening. Accordingly, the first member 1 can be downsized, costs can be reduced, and the workability can be enhanced.

The shape formed by the contact surface 5A of the first member 1 and the contact surface 5a of the second member 7 in the heating reaction container is not limited in particular and may be different from the cylindrical shape. The shape formed by the contact surfaces 5A and 5a may be, for example, a circular frustum shape, a polygonal prism shape, or a polygonal frustum shape. In the shape illustrated in FIG. 11A, when the shape formed by the contact surface 5A of the first member 1 and the contact surface 5a of the second member 7 is a frustum shape, where the diameter decreases toward the bottom surface of the first member 1, the second member 7 can be replaced easily. In the shape illustrated in FIG. 12A, when the shape formed by the contact surface 5A of the first member 1 and the contact surface 5a of the second member 7 is a frustum shape, where the diameter increases toward the bottom surface of the second member 7, the first member 1 can be replaced easily.

Considered now is case where C-22 alloy (Ni: 56 wt %, Cr: 22 wt %, Mo: 13 wt %, W: 3 wt %, Fe: 3 wt %, Co<2.5 wt %, V<0.35 wt %, Mn<0.5 wt %, Si<0.08 wt %, C<0.01 wt %) is used as the first material and SUS316 alloy is used as the second material. The thermal expansion coefficients of the first and second materials are 12.4 micron/m/° C. and 16.0 micron/m/° C., respectively. It is assumed that each contact surface is a cylindrical side surface, the diameter of the contact surface is approximately 80 mm, and the sealing is performed at a temperature equal to or less than 300° C. The difference between the thermal expansion coefficient of the first material and the thermal expansion coefficient of the second material is 3.6 micron/m/° C. At a rough estimate using this value, the difference between the first member 1 and the second member 7 in diameter at room temperature, which is allowable at the maximum, is determined as follows: 80/1000×(300−25)×3.6=79.2 micron. Accordingly, even when the diameter of the contact surface 5A of the first member 1 is large, the sealing of the heating reaction container 10 can be ensured at a temperature equal to or less than 300° C. all the time by causing each step of the contact surface 5E of the second member 7 to be equal to or less than approximately 40 micron per stair, which is the radius value of the allowable diameter difference.

Although the present embodiment and the variations thereof are described as specific aspects of the present disclosure, the present disclosure is not limited thereto. Each contact surface of the first member 1 and the second member 7 may be different from the cylindrical side surface. For example, each of such contact surfaces can be a side surface of a polygonal prism. The space 3 for holding the reaction raw material 2 may be formed by combining the first member 1, the second member 7, and a third member different from the first member 1 and the second member 7.

Although in the present embodiment, the example where Mo is used as the first material and C-276 alloy is used as the second material, and the example where C-22 alloy is used as the first material and SUS316 alloy is used as the second material are described, the combinations of the first material and the second material are not limited thereto.

As described above, the first and second members 1 and 7 can be constituted using Mo, C-276 alloy, C-22 alloy, SUS316 alloy, and the like. Instead, the first and second members 1 and 7 can be constituted of at least one selected from a group consisting of for example, niobium, tantalum, and nickel. To prevent reaction between the material held inside and any of the first and second members 1 and 7 or to reduce high-temperature oxidation, ceramic coating may be performed on at least one of the first member 1 and the second member 7.

A heating reaction container and a reaction method according to an aspect of the present disclosure can be suitably utilized in various uses for which holding a reaction raw material in a sealed state at a high temperature and advancing heating reaction without losing prepared composition are desired, such as active materials for batteries, various ceramic materials, or functional carbon materials.

What is claimed is:

1. A heating reaction container comprising:
    a first member that comprises a first material and has an annular first contact surface;
    a second member that comprises a second material and has an annular second contact surface and an annular third contact surface positioned further inside than the second contact surface; and
    a third member that comprises a third material and has an annular fourth contact surface, wherein
    one of the first member and the third member includes space having an opening to allow a reaction raw material to be provided into an inside of the space,
    the other one of the first member and the third member has a surface with which the opening is closed,
    the opening is closed by the second member being detachably fitted in the first member in a state where the first contact surface faces the second contact surface positioned further inside than the first contact surface and by the third member being detachably fitted in the second member in a state where the third contact surface faces the fourth contact surface positioned further inside than the third contact surface,
    the first contact surface is located inside the first member,
    the first member has a contact surface that comes into contact with the reaction raw material inside the first member,
    the second contact surface is located outside the second member,
    the third contact surface is located inside the second member,
    the fourth contact surface is located outside the third member,
    α1, α2, and α3 satisfy a relation of α3>α2>α1, α3=α2>α1, or α3>α2=α1, where α1 represents a thermal expansion coefficient of the first material, α2 represents a thermal expansion coefficient of the second material, and α3 represents a thermal expansion coefficient of the third material, and
    a gap is present at least one of between the first contact surface and the second contact surface and between the third contact surface and the fourth contact surface before heating of the reaction raw material, the space being sealed, through the heating, by the first contact surface coming into intimate contact with the second contact surface and by the third contact surface coming into intimate contact with the fourth contact surface.

2. The heating reaction container according to claim 1, wherein
    the second member independently holds a shape of the second member.

3. The heating reaction container according to claim 1, wherein
    each of the first material, the second material, and the third material is any one of metal, semimetal, carbon, and ceramic.

4. The heating reaction container according to claim 1, wherein
    the first material and the second material are identical to each other or the second material and the third material are identical to each other.

5. A heating reaction method using a heating reaction container comprising:
    a first member that comprises a first material and has an annular first contact surface;
    a second member that comprises a second material and has an annular second contact surface and an annular third contact surface positioned further inside than the second contact surface; and
    a third member that comprises a third material and has an annular fourth contact surface, wherein
    one of the first member and the third member includes space having an opening to allow a reaction raw material to be provided into an inside of the space,
    the other one of the first member and the third member has a surface with which the opening is closed,
    the opening is closed by the second member being detachably fitted in the first member in a state where the first contact surface faces the second contact surface positioned further inside than the first contact surface and by the third member being detachably fitted in the second member in a state where the third contact surface faces the fourth contact surface positioned further inside than the third contact surface,
    α1, α2, and α3 satisfies a relation of α3>α2>α1, α3=α2>α1, or α3>α2=α1, where α1 represents a thermal expansion coefficient of the first material, α2 represents a thermal expansion coefficient of the second material, and α3 represents a thermal expansion coefficient of the third material, a gap is present at least one of between the first contact surface and the second contact surface and between the third contact surface and the fourth contact surface before heating of the reaction raw material, the heating reaction method comprising:
  sealing the space, through the heating, by causing the first contact surface to come into intimate contact with the second contact surface and by causing the third contact surface to come into intimate contact with the fourth contact surface; and
  causing the reaction raw material to react in the sealed space.

6. A heating reaction container comprising:

a first member that comprises a first material and has an annular first contact surface;

a second member that comprises a second material and has an annular second contact surface and an annular third contact surface positioned further inside than the second contact surface; and a third member that comprises a third material and has an annular fourth contact surface, wherein one of the first member and the third member includes space having an opening to allow a reaction raw material to be provided into an inside of the space, the other one of the first member and the third member has a surface with which the opening is closed, the opening is closed by the second member being detachably fitted in the first member in a state where the first contact surface faces the second contact surface positioned further inside than the first contact surface and by the third member being detachably fitted in the second member in a state where the third contact surface faces the fourth contact surface positioned further inside than the third contact surface, the first contact surface is located inside the first member, the second contact surface is located outside the second member, the third contact surface is located inside the second member, the fourth contact surface is located outside the third member, the third member includes a contact surface that comes into contact with the reaction raw material inside the third member, α1, α2, and α3 satisfy a relation of α3>α2>α1, α3=α2>α1, or α3>α2=α1, where α1 represents a thermal expansion coefficient of the first material, α2 represents a thermal expansion coefficient of the second material, and α3 represents a thermal expansion coefficient of the third material, and a gap is present at least one of between the first contact surface and the second contact surface and between the third contact surface and the fourth contact surface before heating of the reaction raw material, the space being sealed, through the heating, by the first contact surface coming into intimate contact with the second contact surface and by the third contact surface coming into intimate contact with the fourth contact surface.

7. The heating reaction container according to claim 6, wherein the second member independently holds a shape of the second member.

8. The heating reaction container according to claim 6, wherein
  each of the first material, the second material, and the third material is any one of metal, semimetal, carbon, and ceramic.

9. The heating reaction container according to claim 6, wherein
  the first material and the second material are identical to each other or the second material and the third material are identical to each other.

* * * * *